United States Patent [19]
Usuki et al.

[11] Patent Number: 4,889,885
[45] Date of Patent: Dec. 26, 1989

[54] COMPOSITE MATERIAL CONTAINING A LAYERED SILICATE

[75] Inventors: Arimitsu Usuki; Tadashi Mizutani; Yoshiaki Fukushima; Megumi Fujimoto; Kenzo Fukumori; Yoshitsugu Kojima; Norio Sato; Toshio Kurauchi; Osami Kamigaito, all of Aichi, Japan

[73] Assignee: Kabushiki Kaisha Toyota Chuo Kenkyusho, Aichi, Japan

[21] Appl. No.: 164,217

[22] Filed: Mar. 4, 1988

[30] Foreign Application Priority Data

Mar. 4, 1987 [JP] Japan .................................. 62-49630
Mar. 9, 1987 [JP] Japan .................................. 62-53706
Oct. 15, 1987 [JP] Japan .................................. 62-260269
Dec. 22, 1987 [JP] Japan .................................. 62-325049

[51] Int. Cl.$^4$ ...................... C04B 26/02; C08K 3/04; C08L 9/00; C08L 67/00
[52] U.S. Cl. ..................................... 524/445; 523/521; 524/449; 524/450; 524/451; 524/534; 524/789; 524/791; 524/856
[58] Field of Search ............... 524/449, 450, 789, 445, 524/791, 856, 451, 534; 523/521

[56] References Cited

U.S. PATENT DOCUMENTS

| | | | |
|---|---|---|---|
| 4,400,485 | 8/1983 | Mukamai et al. | 524/449 |
| 4,431,755 | 2/1984 | Weber et al. | 524/449 |
| 4,434,075 | 2/1984 | Mardis et al. | 524/236 |
| 4,467,077 | 8/1984 | Meyer et al. | 524/449 |
| 4,560,715 | 12/1985 | Ueeda et al. | 524/449 |
| 4,739,007 | 4/1988 | Okada et al. | 524/789 |
| 4,775,586 | 10/1988 | Bohrn et al. | 524/449 |
| 4,789,403 | 12/1988 | Rice | 524/449 |
| 4,798,766 | 1/1989 | Rice | 524/789 |

Primary Examiner—Herbert J. Lilling
Attorney, Agent, or Firm—Oblon, Spivak, McClelland, Maier & Neustadt

[57] ABSTRACT

A composite material comprising a resin other than polyamide resin and a layered silicate dispersed therein, said layered silicate having a layer thickness of 7 to 12 Å and an interlayer distance of 30 Å or above. Owing to the layered silicate uniformly dispersed in the resin matrix, the composite material is superior in mechanical characteristics and heat resistance. It also has good water resistance and chemical resistance.

17 Claims, No Drawings

COMPOSITE MATERIAL CONTAINING A LAYERED SILICATE

BACKGROUND OF THE INVENTION

1. Field of the Invention:

The present invention relates to a composite material having high mechanical strength and heat resistance which is suitable for use as automotive parts, aircraft parts, and building material. More particularly, it relates to a composite material composed of a resin composition and a layered silicate which are bonded to each other through ionic bond and are uniformly mixed with each other, and also to a process for producing the composite material.

b 2. Description of the Related Art:

Various attempts have been made so far to incorporate an organic polymeric material with an inorganic material such as calcium carbonate, clay mineral, and mica for the improvement of its mechanical properties. Unfortunately, the incorporation of an inorganic material results in a brittle composite material because of the very poor bond strength between the inorganic material and the organic polymer matrix. In addition, the amount of an inorganic material that can be incorporated is limited. There is a known technique to increase the bond strength between an inorganic material and a polymer material. It is the treatment of an inorganic material with a silane coupling agent. However, the improvement achieved by this method results from van der Waals' forces between an inorganic material and an organic polymeric material, and the treatment merely improves the affinity of the two components and is not enough to add reinforcement and increase heat resistance.

For the purpose of improvement of mechanical characteristics, vulcanized rubber is incorporated with a large amount of reinforcing agents such as carbon black and inorganic fillers. Carbon black, among others, produces a remarkable reinforcing effect on vulcanized rubber because it has a variety of active functional groups such as carboxyl group, carbonyl group, phenolic hydroxyl group, and quinone group on the surface of the particles. The reinforcing effect results from the strong mutual action between the functional groups and the polymer chains constituting the rubbery polymer which is the matrix of vulcanized rubber. (See J. B. Donnet and A. Voet, "Carbon Black" (1976), Marcel Dekker.)

For reasons mentioned above, carbon black is still a major reinforcing agent for vulcanized rubber; however, it has a disadvantage that it is produced from petroleum or natural gas whose supply is limited and that it raises the viscosity of the compound and impairs the processability of the compound when it is incorporated in a large amount into rubber. To solve this problem (poor processability of carbon black-filled system), there has been proposed the grafting of polymer chains onto the surface of carbon black particles. However, this new technique is still under development.

On the other hand, inorganic fillers come in various forms, such as fiber, needle, plate, and granules. When it comes to reinforcing ability, fillers of platy form or needle form are advantageous over spherical carbon black.

With the foregoing in mind, the present applicant previously filed "Resin Composition Containing Polyamide" (Japanese Patent Laid-open No. 83551/1982) which comprises a polyamide resin and flaky vermiculite dispersed therein having an average aspect ratio of 5 or over. This resin composition is characterized by that the resin is incorporated with flaky vermiculite having a high aspect ratio (size-to-thickness ratio of particle), thereby to increase the mechanical strength of the resin (organic polymeric material). This resin composition certainly has an improved mechanical strength over conventional resin compositions; however, the improvement is offset by some drawbacks. That is, the flaky vermiculite does not have a sufficiently high aspect ratio because it is produced by mechanical crushing. Moreover, the flaky vermiculite ha to be added in a large amount to produce necessary strength, because of the poor bond strength between the vermiculite layers and the matrix. This might invite the danger of making the resin composition brittle.

In the meantime, several attempts have been made to obtain a composite material by synthesizing a polymer such as polyamide and polystyrene in the space between layers of clay mineral. A disadvantage of the conventional technique is that the molecular chains of the organic polymer do not infiltrate sufficiently into the interlayer space of the clay mineral and consequently the layers of silicate are not uniformly dispersed in the organic polymer. For the uniform dispersion, it is necessary to reduce the aspect ratio of the stratiform mineral, and this adversely affects the mechanical strength of the composite material. An additional disadvantage is that the bonding between the polymer material (matrix) and the layered mineral is not sufficient to provide the desired reinforcing effect.

The combination of a layered silicate and a polymeric substance is used to produce a composite material or to improve the storage stability of epoxy resin. The composite material is composed of polyamide and layered silicate dispersed therein in the form of molecule, because the polymerization of polyamide starts in the interlayer space of the layered silicate. The polymerization is induced by the catalytic effect of organic ions including

present in the interlayer space of the layered silicate. (See Japanese Patent Laid-Open Nos. 72723/1987, and 74957/1987 (which corresponds to U.S. application No. 909,472).) The improvement of the storage stability of epoxy resin is based on the idea that the layered silicate which has teken up a hardener releases the hardener slowly, thereby bringing about the cross-linking reaction. ("Epohard 3000," a product of Adachi Shinsangyo Co., Ltd.)

The above-mentioned composite material containing polyamide resin as a polymeric substance has a disadvantage that it has an increased water absorption and a decreased dimensional stability. Moreover, the composite material in wet state decreases in glass transition point by 40° C. or more as compared with that in dry state. In addition, the composite material decreases in resistance to chemicals such as acids and calcium chloride.

There are several known composite materials formed by the combination of rubber and silicate (clay mineral including hard clay, soft clay, and talc). However, no attempt has been made to combine rubber with an inorganic filler by utilizing the reaction in the interlayer space of a layered silicate, thereby greatly improving the mechanical properties of rubber. Being hydrophilic, a layered silicate is poor in affinity for rubber and also poor in dispersion into rubber. Thus, there has been a demand for a rubber compound in which a layered silicate is uniformly dispersed.

SUMMARY OF THE INVENTION

In order to eliminate the above-mentioned disadvantages, the present inventors carried out a series of researches, which led to the present invention.

The first object of the present invention is to provide a composite material having superior mechanical characteristics and heat resistance, which is composed of a polymer compound and a layered silicate uniformly dispersed therein.

The second object of the present invention is to provide a composite material having superior water resistance and chemical resistance.

The third object of the present invention is to provide a process for producing the above-mentioned composite materials.

The composite material according to the present invention comprises a resin other than polyamide resin and a layered silicate uniformly dispersed in said resin, said silicate having a layer thickness of 7 to 12 Å and an interlayer distance of 30 Å or above.

The process for producing the composite material according to the present invention comprises an ion exchange step of subjecting a layered clay mineral having a cation exchange capacity of 50–200 milliequivalents per 100 g to ion exchange with an onium salt, a mixing step of mixing said ion-exchanged clay mineral with a monomer and/or oligomer of a resin other than polyamide resin, and a polymerization step of polymerizing said monomer and/or oligomer in the mixture formed in said mixing step, or a kneading step of kneading said mixture with solid rubber.

The composite material of the present invention is composed of a polymer compound and a layered silicate uniformly dispersed therein, and it has superior mechanical characteristics, heat resistance, water resistance, and chemical resistance.

The above and other objects, features, and advantages of the present invention will become more apparent from the following description in which a preferred embodiment of the invention is shown by way of illustrative example.

DETAILED DESCRIPTION OF THE INVENTION

The resin constituting the composite material of the present invention is the one other than polyamide resin. It includes, for example, vinyl based polymer compounds, thermosetting resins, polyesters, and rubbers. They may be used alone or in combination with one another. In the latter case, they may be used in the form of blend, graft polymer, copolymer, or block polymer.

The vinyl-based polymer compound is a generic name to denote a polymer composed of monomers having a vinyl group. It is represented by the general formula below.

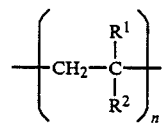

(where $R^1$ and $R^2$ independently denote a hydrogen atom, halogen atom, alkyl group, aryl group, allyl group, or substituted group, which may be the same or different.) The vinyl-based polymer compounds may be used alone or in combination with one another.

Examples of the thermosetting resin include phenolic resin, epoxy resin, unsaturated polyester resin, alkyd resin, furan resin, urea resin, melamine resin, polyurethane resin, and aniline resin. They may be used alone or in combination with one another.

Incidentally, the above-mentioned vinyl-based polymer compounds, thermosetting resins, and polyesters are superior to other resins in strength, heat resistance, chemical resistance, and water absorption resistance. In the case where a resin containing at least one kind of the vinyl-based polymer compound, thermosetting resin, and polyester is used, the above-mentioned effect is more remarkable as the content of these components increases. The desired effect is produced even at a content of 10 wt %.

The layered silicate imparts mechanical characteristics and heat resistance to the polymer material. It is a layered phyllosilicate mineral composed of magnesium silicate layers or aluminum silicate layers having a thickness of 7–12 Å. These layered clay minerals are negatively charged on account of the isomorphous ion exchange. They differ from one another in characteristic properties depending on the density and distribution of negative charges. The preferred layered silicate in this invention is one in which one negative charge occupies an area of 25–200 Å$^2$ on the layer surface.

The composite material of the present invention is composed of a resin other than polyamide resin and a layered silicate uniformly dispersed therein. The content of the layered silicate in the resin should preferably be 0.05 to 150 parts by weight for 100 parts by weight of the resin. With less than 0.05 parts by weight, the layered silicate is not enough to produce the desired reinforcing effect. Conversely, with more than 150 parts by weight, the resulting product is a mere powder of micronized interlayer compound which cannot be molded because of the excessively small resin content.

In the case where rubber is used as a resin, the composite material should preferably be composed of a complex and a solid rubber. The complex is composed of a liquid rubber having positively charged groups and a layered silicate uniformly dispersed in said liquid rubber, with the interlayer distance greater than 30 Å. In addition, the complex should preferably have such a structure that the liquid rubber is solubilized in the solid rubber. This structure is responsible for the composite material having superior mechanical characteristics, oil resistance, fatigue resistance, and processability. These pronounced effects are attributable to the following.

The layered silicate is uniformly dispersed in the rubber component because the layered silicate is directly connected to the liquid rubber having positively charged groups through ionic bond and the liquid rubber is highly miscible with the solid rubber. In addition, in the case of vulcanized rubber, the layered silicate is directly connected to the rubber network chain formed by the rubber component, so that the layered silicate greatly restricts the molecular motion of the rubber network chains in the vicinity (in the order of nanometers) of the interface. This contributes to the improved mechanical characteristics and resistance to swelling by solvent and oil.

The fact that the layered silicate is uniformly dispersed in the rubber component leads to an amplified strain and high stress of the rubber component. Under such conditions, the layered silicate restricts the expanding and contracting rubber over a larger area than spherical fillers such as carbon black.

The good miscibility of the solid rubber with the complex composed of the layered silicate and liquid rubber leads to low viscosity and good processability at the time of processing. This is an advantage over the carbon black-filled system which increases in viscosity at the time of processing. In addition, the layered silicate directly connected to the liquid rubber is easily mobile and this contributes to the dispersibility of the layered silicate.

The liquid rubber component also functions as a non-extractable plasticizer which, unlike a low molecular weight plasticizer such as dioctyl phthalate (DOP) subject to extraction by oil and gasoline, keeps the low temperature characteristics of the composite material. Moreover, the liquid rubber increases the hysteresis loss (energy loss) under repeated deformation and improves the fatigue resistance in concert with the damping effect produced by the filling of layered silicate. In other words, the liquid rubber component functions as a processing aid when the rubber is not yet vulcanized and it also functions as a reactive plasticizer which undergoes covulcanization when the rubber is vulcanized.

The rubber-containing composite material (referred to as rubber composition) is constructed such that the layered silicate is uniformly dispersed in the rubber composition. This structure is formed by dispersing the layered silicate in the form of molecule into the liquid rubber and solubilizing the liquid rubber in the complex into the solid rubber. Any attempt to uniformly disperse the layered silicate into the solid rubber will be unsuccessful because of the poor miscibility of the two components. Thus the above-mentioned structure cannot be made in such a reverse way.

The liquid rubber used in the present invention is one which has a positively charged group. The positively charged group may be in the main chain or side chain of the liquid rubber or at the terminal thereof. The liquid rubber may have one or more than one positively charged group in one molecule. Examples of the liquid rubber include those which have polybutadiene or a modified product thereof in the main chain or a portion thereof and also have in the molecule an onium salt represented by —$M^+R^1R^2R^3$ (where M denotes N, S, P, or

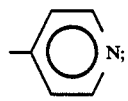

and $R^1$, $R^2$, and $R^3$ independently denote hydrogen atoms, alkyl groups, aryl groups, or allyl group, which may be the same or different). One or more than one liquid rubber may be used. The covulcanization of the liquid rubber and solid rubber depends largely on the molecular weight of the liquid rubber. For good covulcanization, the liquid rubber should preferably have a molecular weight higher than 1000.

The complex composed of the layered silicate and the liquid rubber is composed of the liquid rubber and the layered silicate uniformly dispersed into the liquid rubber. The dispersion of the layered silicate in the form of molecule produces the ionic bond between the liquid rubber and the layered silicate. This ionic bond forms the cross-linked structure of the liquid rubber. In other words, the individual layers of the silicate are completely separated from one another by the force greater than the bond strength (such as van der Waals' forces and electrostatic attractive forces) between the layers. Moreover, the negative charge on the silicate is connected to the positive charge (onium ion) in the liquid rubber through ionic bond.

The layered silicate in the complex should have an interlayer distance greater than 30 Å. With an interlayer distance less than 30 Å, the complex does not uniformly disperse into the solid rubber.

The solid rubber should preferably be one which has a molecular weight greater than 10,000 so that it can be vulcanized in the bulk state.

The complex composed of the layered silicate and liquid rubber should be compounded with the solid rubber at a ratio of 1-100 parts by weight (of the former) to 100 parts by weight (of the latter). If the amount of the complex is less than 1 part by weight, the layered silicate produces only a little reinforcing effect for the rubber phase containing the solid rubber and liquid rubber. With an amount in excess of 100 parts by weight, the content of the liquid rubber in the rubber phase is so high that it impairs the inherent characteristics (oil resistance and heat resistance) of the solid rubber.

The rubber composition may be incorporated, according to need, with carbon black to enhance the reinforcing effect by the layered silicate. Examples of the carbon black include SAF (N110), ISAF (N220), HAF (N330), FEF (N550), GPF (N660), and SRF (N770) [ASTM designations in parentheses]. Carbon black should be added in an amount of 0-100 parts by weight, preferably 0-70 parts by weight for 100 parts by weight of the solid rubber. With an amount in excess of 100 parts by weight, the resulting rubber composition has such a high viscosity that the improvement of processability (decrease of viscosity) by the complex is less significant.

The content of the layered silicate in the complex should preferably be 20-1000 parts by weight for 100 parts by weight of the liquid rubber. With a content less than 20 parts by weight, the layered silicate produces only a little reinforcing effect for the rubber component when it is mixed with the solid rubber. With a content greater than 1000 parts by weight, a large portion of the layered silicate remain unconnected to the liquid rubber and the layered silicate does not uniformly disperse on account of coagulation.

The rubber composition is characterized by that the liquid rubber in the complex is solubilized in the solid rubber. In other words, the liquid rubber component in the complex has good miscibility with the solid rubber. Their molecular chains are miscible with one another, with the size being of the order of 10 nm or below. Thus, a uniform rubber phase is formed.

The solid rubber includes natural rubber, synthetic rubber, thermoplastic elastomer, and a blend thereof. Examples of the synthetic rubber include isoprene rubber, chloroprene rubber, styrene rubber, nitrile rubber, ethylene-propylene rubber, butadiene rubber, butyl rubber, epichlorohydrin rubber, acrylic rubber, urethane rubber, fluoro rubber, silicone rubber, ethylene-vinyl acetate rubber, Hypalon, and chlorinated polyethylene. Examples of the thermoplastic elastomer include 1,2-polybutadiene, styrene-butadiene block copolymer, and styrene-isoprene block copolymer. They may be used alone or in combination with one another. A diene rubber is preferable for the improved covulcanization with the liquid rubber in the rubber composition.

The rubber composition may be incorporated, in addition to carbon black, with an acid acceptor and antioxidant and other commonly used additives according to need. This rubber composition can be vulcanized with sulfur, peroxide, etc. which are vulcanizing agent and vulcanization accelerator commonly used for solid rubber. In addition, vulcanization can be accomplished with any vulcanizing molding machine.

As mentioned above, the composite material of the present invention is composed of a resin and a layered silicate constituting the stratiform clay mineral thereof dispersed in the form of molecule in the resin. The resin has a cross-linked structure on account of a strong interaction (such as ionic bond) between the resin and the silicate layers. In other words, the individual layers of the silicate are completely separated from one another by the force greater than the bond strength (such as van der Waals' forces and electrostatic attractive forces) between the layers. Moreover, the negative charge on the silicate is connected to the positive charge (onium ion) in the resin through ionic bond.

The composite material of the present invention is produced according to the process explained in the following. At first, a layered clay mineral having a cation exchange capacity of 50–200 milliequivalents per 100 g is subjected to ion exchange with an onium salt in the ion exchange step. In this step, the exchangeable inorganic ions in the clay mineral are exchanged with the organic onium ions.

The ion exchange step may be accomplished by uniformly mixing a clay mineral and an onium salt in water or a mixture of water and a solvent using a mixer. The mixture obtained by the mixing step may be used as such (containing water or the mixture of water and a solvent) in the subsequent step, or it may be deprived of water or the mixture of water and a solvent by filtration, followed by washing several times with pure water for the removal of unreacted onium salt, and finally freeze-drying.

The clay mineral has a cation exchange capacity of 50–200 milliequivalents per 100 g. In other words, it has a large contact area for the monomer to be reacted. Examples of the clay mineral include smectite clay minerals (such as montmorillonite, saponite, beidellite, nontronite, hectorite, and stevensite); and vermiculite and halloysite. They may be either natural ones or synthetic ones. The clay mineral is required to have a cation exchange capacity of 50–200 milliequivalents per 100 g. With a capacity greater than the upper limit, the clay mineral does not provide the desired composite material because of the excessively high interlayer bond strength. With a capacity smaller than the lower limit, the clay mineral does not provide the desired composite material because of the insufficient ion exchange with the organic onium ions. Incidentally, the clay mineral should preferably be ground beforehand into particles of desired shape and size by means of a mixer, ball mill, vibration mill, pin mill, jet mill, or the like.

The onium ions expand the interlayer distance of the clay mineral through ion exchange with inorganic ions in the clay mineral. It also permits the clay mineral to take a polymer into the interlayer space and connects the layers of clay mineral and the polymer to each other through ionic bond. A preferred onium salt is one which has the molecular skeletons which constitute the polymerization initiator for the resin, the basic constituting units of the resin, or the hardening agent to cross-link or cure the resin.

Examples of the onium salt include ammonium salt, pyridinium salt, sulfonium salt, and phosphonium salt. They are used alone or in combination with one another.

The onium salt having the molecular skeleton which becomes the polymerization initiator includes those which have a carboxyl group, amino group, or isocyanate group. Preferable among them are ammonium 12-aminododecanoate, ammonium 14-aminotetradecanoate, and ammonium 16-aminohexadecanoate.

The onium salt having the molecular skeleton which becomes the basic constituting units of the resin includes an onium salt having a phenol group (for phenolic resin), an onium salt having an epoxy group (for epoxy resin), and an onium salt having polybutadiene (for acrylonitrilebutadiene rubber).

The onium salt having the molecular skeleton which becomes the hardening agent includes those which have an aryl group, allyl group, or amino group. Preferable among them are hexamethylenetetramine, diamines, and ammonium salts having an acid anhydride derivative in the molecule.

In the case where the resin is a vinyl-based polymer, it is desirable to use an onium salt having a terminal vinyl group represented by the formula:

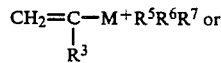

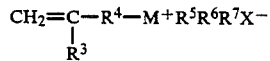

(where $R^3$ is a hydrogen atom, alkyl group, aryl group, or allyl group; $R^4$ is an alkylene group (such as methylene group and ethylene group) or arylene group (such as phenylene group) with or without a carbonyl group, carboxyl group, or thiocarbonyl group in the main chain or side chain; $R^5$, $R^6$, and $R^7$ are independently a hydrogen atom, alkyl group, aryl group, or allyl group with or without a substituting group, which may be the same or different; and M denotes N, S, P, or

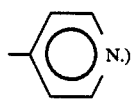

The above-mentioned onium salts are used alone or in combination with one another.

In the next step (mixing step), the clay mineral which has undergone ion exchange in the foregoing ion exchange step is mixed with a monomer and/or oligomer of a resin. The monomer and/or oligomer is a raw material which upon polymerization becomes a resin. It is a basic material for the composite material.

In the case where the resin is a vinyl-based polymer compound, the monomer is ethylene, propylene, or the like which has a vinyl group. Examples of such a monomer include ethylene, propylene, butadiene, isoprene, chloroprene, vinyl chloride, vinylidene chloride, vinyl fluoride, vinylidene fluoride, styrene, $\alpha$-methylstyrene, divinyl benzene, acrylic acid, methyl acrylate, ethyl acrylate, n-propyl acrylate, iso-propyl acrylate, n-butyl acrylate, iso-butyl acrylate, t-butyl acrylate, methacrylic acid, methyl methacrylate, ethyl methacrylate, n-propyl methacrylate, iso-propyl methacrylate, n-butyl methacrylate, iso-butyl methacrylate, t-butyl methacrylate, acrylamide, methylacrylamide, ethyl acrylamide, n-propyl acrylamide, iso-propyl acrylamide, acrylonitrile, vinyl alcohol, norbornadiene, N-vinylcarbazole, vinylpyridine, vinylpyrrolidone, 1-butene, isobutene, vinylidene cyanide, 4-methylpentene-1, vinyl acetate, vinyl isobutyl ether, methyl vinyl ketone, phenyl vinyl ketone, methyl vinyl ether, phenyl vinyl ether, phenyl vinyl sulfide, and acrolein. They may be used alone or in combination.

The mixing of the clay mineral with the monomer and/or oligomer of a resin is accomplished mechanically by means of an automatic mortar or vibration mill. In the mixing step, there is obtained a mixture composed of the monomer and/or oligomer of a resin and the above-mentioned clay mineral dispersed therein.

In the case where the above-mentioned resin is other than rubber, the mixture obtained in the foregoing mixing step undergoes the subsequent step (polymerization step) in which the monomer and/or oligomer of a resin in the mixture is polymerized. As the result of polymerization, there is obtained the desired composite material. In the case where the above-mentioned resin is rubber, the mixture obtained in the foregoing mixing step undergoes the subsequent step (kneading step) in which the mixture is kneaded with a solid rubber to give the desired composite material.

The polymerization in the polymerization step may be carried out while the mixture is kept as such or after the mixture has been dispersed in a polar solvent.

Examples of the polar solvent include water, ether, carbon disulfide, carbon tetrachloride, glycerine, toluene, aniline, benzene, chloroform, N,N,-dimethyl formamide, phenol, tetrahydrofuran, acetone, propylene carbonate, acetic acid, methanol, ethanol, propanol, methyl ethyl ketone, pyridine, benzonitrile, acetonitrile, dimethylsolfoxide, nitrobenzene, and nitromethane. They may be used alone or in combination with one another.

The polymerization may be carried out by adding a polymerization initiator to the mixture or irradiating the mixture with heat or light. The type of polymerization that can be employed is radical polymerization, cation polymerization, anion polymerization, coordination polymerization, or polycondensation. A proper initiator should be selected according to the type of polymerization employed.

The kneading in the kneading step may be accomplished by using a kneader or roll with heating.

According to the process of the present invention, a polymer is formed by the aid of an organic onium salt which has previously been attached to the layers of a layered clay mineral capable of cation exchange, said onium salt becoming a molecule to function as a polymerization initiator, a molecule as a constituting unit of a polymer, or a molecule to function as a hardener which cross-links or cures a polymer. Thus, polymerization starts, polymer terminals grow, and cross-linking takes place in the interlayer space of the layered clay mineral, thereby expanding the interlayer distance, with the result that the layers of the clay mineral bind to the polymer and there is obtained the desired composite material composed of the polymer and the clay mineral uniformly dispersed therein.

The composite material which is composed of a complex and solid rubber, said complex being composed of liquid rubber having a positively charged group and a layered silicate dispersed therein, and has such a structure that the liquid rubber in the complex is miscible in the solid rubber, may be produced by forming a complex of a layered silicate and liquid rubber and then solubilizing the liquid rubber in the complex into the solid rubber.

The complex composed a layered silicate and liquid rubber may be produced in the following manner. At first, a clay mineral composed of a layered silicate is uniformly dispersed in water in a concentration lower than 5 wt %. Separately, liquid rubber having a positively charged terminal group is dispersed in a water-miscible polar solvent or a mixture of water and said polar solvent in a concentration lower than 20 wt %. They are mixed together with vigorous stirring to make a homogeneous solution. The mixing ratio of the layered silicate to the liquid rubber should preferably be 1:0.1 to 1:5 on dry basis. The complex which is composed of the layered silicate and liquid rubber and dispersed in the water containing mixed solvent is collected by vacuum filtration or pressure filtration, followed by preliminary drying at 50°–100° C. and drying at 80°–150° C. in vacuo.

The solubilization of the liquid rubber in the complex into the solid rubber may be accomplished by mixing the complex with solid rubber. During the mixing, carbon black or other additives are added. Thus, there is obtained the desired composite material which is based on rubber as resin.

The composite material obtained as mentioned above may be directly molded by injection molding or heating pressure molding, or mixed with other polymer at a predetermined ratio. Alternatively, it is also possible to obtain molded products by performing the above-mentioned polymerization reaction in a mold.

The composite material of the present invention has superior mechanical strength and heat resistance. The mechanism by which it exhibits such outstanding performance is not yet fully elucidated. However, it is assumed as follows: What characterizes most the composite material of the present invention is the fact that the molecular chains of the resin are cross-linked with the layered clay mineral through ionic bond. This cross-linked structure makes the composite material resistant to thermal and mechanical deformation. This is the reason why the composite material has superior mechanical properties (such as tensile strength and elastic modulus) and heat resistance (such as softening point and high-temperature strength). In addition, the composite material contains the layered inorganic substance uniformly dispersed therein. This gives the composite material superior dimensional stability, abrasion resistance, surface lubricity, and water resistance. The layered silicate is dispersed such that the individual dispersed layers are as thin as 10 Å, which is of the order of molecular size, and they are firmly connected to the chains of organic molecules. For this reason the composite material is not brittle in spite of the comparatively large amount of filler, unlike conventional composite materials filled with an inorganic substance.

The above-mentioned unique structure formed by ionic bond between the polymer chains and the layered silicate increases the entanglement of polymer chains in the high-temperature range. This is responsible for the high elastic modulus in the rubbery state.

The polymer chains held between the layers of the silicate are protected from the transmission of heat and the propagation of cracking due to a shielding effect of the silicate layer; therefore, the composite material resists a considerably large amount of heat and stress momentarily.

Because of the improved mechanical properties at high temperatures, the composite material of the present invention will find use as automotive parts, aircraft parts, and building material. In addition, because of the improved melt viscosity and solution viscosity, it will find use as a thickening agent, paint dispersing agent, and grease.

The composite material of the present invention has superior water resistance and chemical resistance.

The composite material of the present invention having superior reinforcing ability can be produced by the ion exchange step, mixing step, and polymerization step or kneading step, and the production process does not need any post treatment such as heating and melting to increase strength after polymerization or kneading. This leads to economy and efficiency.

The composite material obtained by the process of the present invention has superior mechanical strength and heat resistance.

According to the process of the present invention, not only is it possible to produce the composite material of superior properties economically and efficiently, but it is also possible to eliminate some steps used in the production of conventional composite materials. In other words, it is possible to eliminate the steps for surface treatment and mixing of minerals because they can be accomplished in the polymerization step or kneading step. It is possible to simplify the steps of crushing and mixing the clay mineral because the layers of the clay mineral are dispersed by the aid of chemical reaction. This eliminates the possibility of the clay mineral decreasing in aspect ratio. Not only the finished composite material but also the intermediate product composed of the clay mineral and the monomer and/or oligomer of a resin may be stored or transported because the clay mineral does not deteriorate the monomer and/or oligomer and polymer and is superior in storage stability.

The invention will be more clearly understood with reference to the following examples.

EXAMPLE 1

For the purpose of ion exchange, a clay mineral ("Kunipia F", high-purity Na-type montmorillonite having a layer thickness of 9.6 Å, a product of Kunimine Kogyo Co., Ltd.) was mixed in water with an ammonium salt having a terminal vinyl group represented by the formula below:

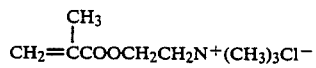

Five parts by weight of the clay mineral which had undergone ion exchange was dispersed into N,N'-dimethylformamide. To the dispersion were added 100 parts by weight of methyl methacrylate (MMA) (as a monomer of vinyl-based polymer compound), 0.5 parts by weight of potassium persulfate (as a radical polymerization initiator), and 10 parts by weight of water. The resulting mixture was heated with stirring at 60° C. for 5 hours. The resulting viscous liquid was deprived of dimethylformamide as much as possible, and it was added dropwise to methanol for reprecipitation of polymethyl methacrylate.

The thus obtained product was found by IR, NMR, and elemental analysis to be a composite material composed of polymethyl methacrylate and 5.7% of montmorillonite dispersed therein. The X-ray diffractometry of this composite material gave no peak attributable to the (001) plane of montmorillonite. This indicates that the individual layers of montmorillonite are uniformly dispersed in the polymer. In addition, the polymer was found to have a number-average molecular weight ($M_n$) of $9.15 \times 10^4$ and a weight-average molecular weight ($M_w$) of $3.80 \times 10^5$ according to GPC (gel permeation chromatography). The composite material was found to have a melt viscosity of 2300 Pa·s (at 220° C. and a shear rate of 370 s$^{-1}$). The composite material was capable of injection molding, and the molded product retained its shape in the temperature range from the glass transition point (Tg) to 250° C. The molded product was found to have a modulus of 5.68 GPa (0° C.) according to viscoelastic tests.

COMPARATIVE EXAMPLE 1

Polymethyl methacrylate was formed by polymerizing methyl methacrylate in the same manner as in Example 1 except that the clay mineral was not used. The resulting polymer was found to have a molecular weight of $M_n = 3.11 \times 10^4$ and $M_w = 7.74 \times 10^4$ according to GPC. In addition, the polymer was found to have a melt viscosity of 340 Pa·s (at 220° C. and a shear rate of 370 s$^{-1}$). Upon injection molding, the polymer gave a molded product which became a viscous liquid at 150° C. The molded product was found to have a modulus of 4.57 GPa according to viscoelastic tests performed in the same manner as in Example 1.

COMPARATIVE EXAMPLE 2

Five parts by weight of Na-type montmorillonite (the same one as used in Example 1) was dispersed into water. To the dispersion were added 100 parts by weight of methyl methacrylate and 0.5 parts by weight of potassium persulfate, and the resulting mixture was heated at 60° C. with stirring for 5 hours. The resulting product was a mere mixture in which methyl methacrylate remained unreacted.

COMPARATIVE EXAMPLE 3

A composite material was prepared in the same manner as in Example 1 except that the onium salt was replaced by a compound represented by the formula $CH_3CH_2CH_2N^+(CH_3)_3Cl^-$.

The resulting composite material was found to have a molecular weight of $M_n = 1.21 \times 10^4$ and $M_w = 7.68 \times 10^4$. The molded product of the composite material was found to have a modulus of 4.48 GPa.

EXAMPLE 2

A composite material was prepared in the same manner as in Example 1 except that the monomer was replaced by isoprene.

The resulting composite material was found to be composed of polyisoprene and 5.6% of montmorillonite dispersed therein, according to IR, NMR, and elemental analysis. The X-ray diffractometry of this composite material gave no peak attributable to the (001) plane of montmorillonite. This indicates that the individual layers of montmorillonite are uniformly dispersed in the polymer.

EXAMPLE 3

A composite material was prepared in the same manner as in Example 1 except that the monomer was replaced by styrene and the ammonium salt having a terminal vinyl group was replaced by the one represented by the formula below.

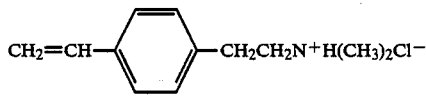

The resulting composite material was found to be composed of polystyrene and 5.3% of montmorillonite dispersed therein, according to IR, NMR, and elemental analysis. The X-ray diffractometry of this composite material gave no peak attributable to the (001) plane of montmorillonite. This indicates that the individual layers of montmorillonite are uniformly dispersed in the polymer. The injection molded product of the composite material was found to have a modulus of 5.3 GPa according to viscoelastic tests.

EXAMPLE 4

The ion-exchange for montmorillonite was carried out in the same manner as in Example 1 except that the ammonium salt having a terminal vinyl group was replaced by the one represented by the formula below.

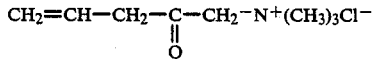

Five parts by weight of the montmorillonite which had undergone ion exchange was dispersed into ethyl chloride. To the dispersion was added 100 parts by weight of α-methylstyrene (as a monomer), followed by cooling to −130° C. To the cooled dispersion was added a solution prepared by dissolving 0.5 parts by weight of anhydrous aluminum chloride (as a cation polymerization initiator) to 50 parts by weight of ethyl chloride, followed by stirring for 1 hour. Thus there was obtained a composite material.

The resulting composite material was found to be composed of poly-α-methylstyrene and 5.1% of montmorillonite dispersed therein, according to IR, NMR, and elemental analysis. The molded product of the composite material was found to have a modulus of 5.0 GPa according to viscoelastic tests.

EXAMPLE 5

The ion-exchange process was carried out in the same manner as in Example 1 except that saponite (having a layer thickness of 10.0 Å) was used as the clay mineral and the ammonium salt having a terminal vinyl group was replaced by the one represented by the formula below.

$$CH_2=CH-CH_2CH_2CH_2N^+(CH_3)_3Br^-$$

Five parts by weight of the saponite which had undergone ion exchange was dispersed into dimethylformamide. To the dispersion was added 100 parts by weight of acrylonitrile (as a monomer), followed by cooling to −50° C. To the cooled dispersion was added 20 parts by weight of saturated solution of anhydrous sodium cyanide (as an anion polymerization initiator) in dimethylformamide, followed by stirring for 1 hour. Thus there was obtained a composite material.

The resulting composite material was found to be composed of polyacrylonitrile and 5.3% of saponite dispersed therein, according to IR, NMR, and elemental analysis.

EXAMPLE 6

For the purpose of ion exchange, a clay mineral ("Kunipia F" made by Kunimine Kogyo Co., Ltd.) was mixed in water with an onium salt represented by the formula below:

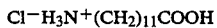

$$Cl^-H_3N^+(CH_2)_{11}COOH$$

Five parts by weight of the clay mineral which had undergone ion exchange was dispersed into N,N,-dimethylformamide. To the dispersion was added 100 parts by weight of "Epicoat 828" (an epoxy resin having a molecular weight of 380, made by Shell Chemical Co., Ltd.) as an oligomer of thermosetting resin. The resulting mixture was heated with stirring at 80° C. for 2 hours. The resulting product was deprived of N,N,-dimethylformamide. Upon drying, there was obtained a composite material composed of epoxy resin and montmorillonite.

The thus obtained composite material was found by IR, NMR, and elemental analysis to be composed of epoxy resin and 5.3% of montmorillonite dispersed therein. The X-ray diffractometry of this composite material indicated that the value of d (001) of montmorillonite increased from 9.6 Å to 50 Å. This suggests that the layers of the clay mineral are dispersed in the epoxy resin.

One hundred parts by weight of this composite material was mixed with 30 parts by weight of diaminodiphenylsulfone, and the mixture underwent compression molding at 200° C. to give a platy molded product. Upon examination by X-ray diffractometry, the molded product gave no peak attributable to the (001) plane of montmorillonite. This indicates that the layer of montmorillonite are dispersed completely uniformly. This was also confirmed by the observation with a transmission electron microscope. The molded product had a heat distortion temperature of 207° C. and an Izod impact resistance of 1.08 J/m.

For the purpose of comparison, 100 parts by weight of "Epicoat 828" was thoroughly mixed with 30 parts by weight of diaminodiphenylsulfone, and the resulting mixture underwent compression molding at 200° C. The molded product had a heat distortion temperature of 193° C. and an Izod impact resistance of 0.91 J/m.

EXAMPLE 7

A composite material was prepared from 5 parts by weight of montmorillonite which had underwent ion exchange in the same manner as in Example 6, 70 parts by weight of epichlorohydrin (as a monomer of thermosetting resin), 30 parts by weight of bisphenol-A, and 30 parts by weight of 40% NaOH aqueous solution. The components were stirred at 120° C. for 3 hours. According to X-ray diffractometry, the composite material did not give the peak attributable to the (001) plane of montmorillonite. This indicates that the layers of montmorillonite are uniformly dispersed in the composite material.

One hundred parts by weight of the composite material was mixed with 30 parts by weight of diaminodiphenylsulfone in the same manner as in Example 6, and the resulting mixture underwent compression molding at 200° C. The molded product had a heat distortion temperature of 208° C. and an Izod impact resistance of 1.08 J/m.

EXAMPLE 8

For the purpose of ion exchange, 100 parts by weight of Na-type montmorillonite was mixed with 20 parts by weight of hydrochloride of 4-dimethylamino-1-butanol (($CH_3$)$_2$N$CH_2CH_2CH_2CH_2$OH) in water. Five parts by weight of the montmorillonite which had undergone ion exchange was mixed with 35 parts by weight of 1,4-butanediol and 70 parts by weight of toluene-2,4-diisocyanate at 60° C. in toluene. The reaction was accelerated by 0.5 parts by weight of dibutyltin dilaurate. After the reaction for 3 hours, the reaction liquid was added dropwise to water. Thus there was obtained a composite material composed of polyurethane and montmorillonite.

According to X-ray diffractometry, the composite material did not give the peak attributable to the (001) plane of montmorillonite. This indicates that the layers of montmorillonite are uniformly dispersed in polyurethane.

EXAMPLE 9

For the purpose of ion exchange, 100 parts by weight of Na-type montmorillonite was mixed with 20 parts by weight of 4-aminostyrene hydrochloride in water. In a separate reaction vessel, 60 parts by weight of maleic anhydride was mixed with 40 parts by weight of ethylene glycol, followed by stirring at 80° C. for 30 minutes and reaction at 190° C. for 2 hours. After cooling to 100° C., 100 parts by weight of the mixture was mixed with 5 parts by weight of the montmorillonite which had undergone ion exchange and 25 parts by weight of styrene, followed by stirring. After cooling to room temperature, the mixture was mixed with 1 part by weight of benzoyl peroxide, followed by stirring, to give a molded product. After standing for 2 hours, there was obtained a hard, tough composite material.

According to X-ray diffractometry, the composite material did not give the peak attributable to the (001) plane of montmorillonite. This indicates that the layers of montmorillonite are uniformly dispersed in polyester resin. The composite material had a heat distortion temperature of 187° C. and a Rockwell hardness of 115.

EXAMPLE 10

For the purpose of ion exchange, 100 parts by weight of Na-type montmorillonite was mixed with 20 parts by weight of 4-aminophenol hydrochloride in water. To 5 parts by weight of the montmorillonite which had undergone ion exchange were added 60 parts by weight of phenol, 40 parts by weight of 37% formaldehyde aqueous solution, and 1 part by weight of oxalic acid dihydrate, followed by stirring and heating under reflux for 1 hour. Thus there was obtained a composite material composed of novolak resin and montmorillonite. To this composite material were added 10 parts by weight of hexamethylenetetramine, 2 parts by weight of magnesium oxide, and 1 part by weight of magnesium stearate, followed by uniform mixing. The resulting mixture underwent press molding at 160° C. for 5 minutes. Thus there was obtained a composite material composed of phenolic resin and montmorillonite. This composite material had a heat distortion temperature of 210° C. and a tensile modulus of 7.2 kg/cm$^2$ at room temperature.

For the purpose of comparison, a composite material was prepared in the same manner as mentioned above except that Na-type montmorillonite which ad not undergone ion exchange was used. The resulting composite material had a heat distortion temperature of 205° C. and a tensile modulus of 6.5 kg/cm$^2$ at room temperature.

EXAMPLE 11

In a polymerization vessel were placed 82.8 g of dimethyl terephthalate, 63.0 g of ethylene glycol, 0.05 g of calcium acetate, and 0.012 g of antimony trioxide. To the reaction system was added 25.0 g of 12-montmorillonite containing 22.3 g of water. The reactants were stirred under a nitrogen stream at 197° C. for 2 hours. The reactants were kept at 220° C. for 20 minutes and then reacted with one another at 280° C. for 1 hour. During the reaction, water, methanol, and ethylene glycol were removed by distillation. The reaction vessel was evacuated to 0.1 mmHg, and this vacuum was maintained until ethylene glycol was not distilled any longer.

According to X-ray diffractometry, the resulting composite material did not give any peak attributable to the (001) plane of montmorillonite. This indicates that the layers of montmorillonite are uniformly dispersed in the composite material. In addition, the composite material was found by elemental analysis to contain 6.2% of montmorillonite.

This composite material was formed into a 12-μm thick film by extrusion molding. The film had a tensile strength of 94.1 MPa. After biaxial orientation, the film had a tensile strength of 275 MPa.

For the purpose of comparison, a commercial polyester was formed into a film of the same shape. The film had a tensile strength of 64.0 MPa, and after biaxial orientation, the film had a tensile strength of 220 MPa.

EXAMPLE 12

In this example and the following examples 13 to 15, composite materials were prepared from rubber as resin. Their physical properties were measured according to the test methods given below.

(A) Tensile test: Expressed by the stress at 100% strain measured according to JIS K-6301. A hystersis loss (%) is obtained from H/W, where H is the loss strain energy and W is the input strain energy under repeated deformation in an equilibrium state, under the condition of 50% dynamic strain.

(B) Dynamic viscoelasticity test: A specimen measuring 2 mm thick, 5 mm wide, and 25 mm long is examined for storage modulus (E') at 25° C. and 100° C. and peak temperature of mechanical loss (tan δ) using a viscoelastic spectrometer, Model VEF-S, made by Iwamoto Seisakusho Co., Ltd., under the condition of frequency at 10 Hz and dynamic strain at 0.04%.

(C) Swelling test: A discoid specimen, 2 mm thick and 19 mm in diameter, is immersed in benzene (reagent grade) and the equilibrium swelling is measured after 72 hours. The swelling is defined by the reciprocal of the volume fraction ($V_r$) of rubber excluding filler to the solvent which had infiltrated into rubber. (In other words, it is expressed by $1/V_r$.) There is a relationship expressed by $V_r + V_s = 1$ between the volume fraction of rubber ($V_r$), and the volume fraction of solvent ($V_s$).

(D) Mooney viscosity test (in the case of an unvulcanized composite material): Performed according to JIS K-6300.

To a mixed solvent composed of 5.5 liters of dimethylsulfoxide (DMSO) and 5.5 liters of water was dispersed 800 g of liquid polybutadiene (a product of Ube Industries, Ltd., "Hycar ATBN 1300×16", having a molecular weight of 3400 and containing 16.5% of acrylonitrile (AN), represented by the formula below).

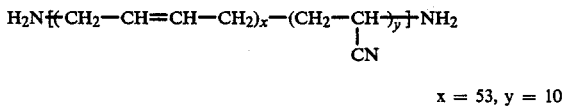

$$x = 53, y = 10$$

To the dispersion was added 47.3 ml of conc. (35%) hydrochloric acid. The dispersion of the liquid polybutadiene was added to a suspension of Na-type montmorillonite (385 g) dispersed in 20 liters of water by using a propeller stirrer. The Na-type montmorillonite is "Kunipia F" made by Kunimine Kogyo Co., Ltd., having a silicate layer thickness of 10 Å, a silicate layer size of 1000 Å by 1000 Å, a layer surface area of 100 Å² per negative charge, and a cation exchange capacity of 119 milliequivalents per 100 g.

The reaction product was filtered and collected by a filter press, followed by preliminary drying at 80° C. and vacuum drying at 100° C. Thus there was obtained a complex composed of montmorillonite and liquid polybutadiene. The spin-spin relaxation time ($T_2$), of the complex was measured by pulse NMR. There were observed $T_2$ component ($T_{2S}$) of about 10 μs in the resin (glass) state and $T_2$ component ($T_{2L}$) of above 1 ms in the rubber state in terms of molecular mobility of proton ($^1H$) in the liquid polybutadiene. The amount of the $T_{2L}$ component corresponding to the region in which the molecular mobility is strongly restricted is about 20%. This indicates that a strong bond is formed between the montmorillonite and the liquid polybutadiene and about 20% of the rubber molecular chain is restricted near the interface. The X-ray diffractometry of this complex indicates that the (001) plane of montmorillonite has disappeared and the layers of montmorillonite are uniformly dispersed in the liquid polybutadiene. Incidentally, it was found that the montmorillonite in the complex has a silicate interlayer distance greater than 80 Å.

The complex was cooled with liquid nitrogen and then crushed by a hammer mill (Hosokawa Micron, Fitz Mill) into particles smaller than 3 mm in diameter at a feed rate of 500 g/min. The crushed complex was mixed with solid rubber (acrylonitrile-butadiene copolymer rubber (NBR), containing 33% of AN, "Nipol 1042" made by Nippon Zeon Co., Ltd.) according to the formulation shown in Table 1. To each mixture were added 1.5 parts by weight of sulfur (as a vulcanizing agent), 1 part by weight of dibenzothiazyl disulfide (as a vulcanization accelerator), 3 parts by weight of zinc oxide (as a vulcanization auxiliary), and 1 part by weight of stearic acid. The mixture was kneaded by an 8-inch roll mill at 50° C. Thus there were obtained rubber compounds (Sample Nos. 1 and 2). The amount of montmorillonite filled in Sample Nos. 1 and 2 is 5 parts by weight and 10 parts by weight, respectively, for 100 parts by weight of the rubber compound.

For the purpose of comparison, Sample Nos. C1 to C4 specified below were prepared in the same manner as mentioned above, as shown in Table 1.

Sample No. C1. Produced from pure NBR without the complex.

Sample No. C2. The complex was replaced by a mixture prepared by a simple mechanical mixture of montmorillonite and liquid butadiene at a ratio of 1:2.

Sample No. C3. The complex was replaced by montmorillonite alone.

Sample No. C4. The complex was replaced by SRF carbon.

In the case of Sample No. C2, which is a mere mechanical mixture of montmorillonite and liquid butadiene, the X-ray diffractometry gave a hardly varying peak corresponding to the (100) plane of montmorillonite and the pulse NMR gave no data corresponding to the region of the rubber with its molecular mobility strongly restricted. This indicates that there is only a small mutual action between the montmorillonite and the liquid polybutadiene. Incidentally, the mechanical mixture is an uncrushable paste, with the coagulated montmorillonite enclosed by the liquid polybutadiene. The amount of montmorillonite or carbon black filled in Sample Nos. C1 to C4 is 0, 10, 10, and 20 parts by weight, respectively, for 100 parts by weight of the rubber compound.

The above-mentioned six samples, both unvulcanized and vulcanized by pressing at 160° C. for 15 minutes, were examined for physical properties such as tensile test, dynamic viscoelastic test, swelling test and Mooney test. The results are shown in Table 2. It is apparently noted from Table 2 that the samples in the working examples are superior to the samples in the comparative examples in tensile characteristics, dynamic viscoelastic characteristics, and swelling characteristics. The samples in the working examples have a peak temperature of mechanical loss which is lower than that of Sample No. C1 prepared from pure rubber. This indicates that the liquid rubber component is solubilized in the solid rubber and the silicate layers of montmorillonite are uniformly dispersed in the rubber compound.

It is also noted that the samples in the working examples are superior to the comparative samples (except for Sample No. C2) in moldability and processability on account of the lower Mooney viscosity. (In the case of Sample No. C2, the liquid rubber incapable of combining with montmorillonite functions as a plasticizer by itself, lowering the Mooney viscosity to an extreme extent. However, Sample No. C2 has no adavantages in other properties.)

TABLE 1

| Components (parts by weight) | Sample No. in Example 1 | Sample No. in Example 2 | Sample No. in Comparative Example C1 | C2 | C3 | C4 |
|---|---|---|---|---|---|---|
| NBR | 90 | 80 | 100 | 100 | 100 | 100 |
| Complex of montmorillonite and liquid polybutadiene | 15 | 30 | — | — | — | — |
| Mechanical mixture of montmorillonite and liquid polybutadiene | — | — | — | 30 | — | — |
| Montmorillonite | — | — | — | — | 10 | — |
| SRF carbon | — | — | — | — | — | 20 |
| Amount of montmorillonite or SRF carbon for 100 parts by weight of rubber compound | 5 | 10 | 0 | 10 | 10 | 20 |

TABLE 2

| Test Items | Sample No. in Example 1 | Sample No. in Example 2 | Sample No. in Comparative Example C1 | C2 | C3 | C4 |
|---|---|---|---|---|---|---|
| 100% strain stress (MPa) | 1.5 | 2.1 | 1.0 | 1.2 | 1.1 | 1.4 |
| Hysteresis loss (%) | 13 | 17 | 10 | 12 | 11 | 12 |
| Storage modulus (MPa) at 25° C. | 5.4 | 8.8 | 3.3 | 4.5 | 4.2 | 5.6 |
| Storage modulus (MPa), at 100° C. | 3.7 | 5.7 | 2.4 | 2.8 | 3.0 | 3.8 |
| Peak temp. of mechanical loss (°C.) | −13 | −13 | −11 | −13 | −9 | −11 |
| Swelling in benzene | 4.22 | 4.10 | 4.86 | 4.87 | 4.67 | 4.36 |
| Mooney viscosity (ML$_{1+4}$, 100° C.) | 53 | 47 | 57 | 22 | 58 | 64 |

EXAMPLE 13

A rubber compound (Sample No. 3) was prepared in the same manner as in Example 12 by incorporating the rubber compound (Sample No. 2 in Example 12) with SRF carbon according to the formulation shown in Table 3. For the purpose of comparison, a rubber compound (Sample No. C5) was also prepared in the same manner as above except that the complex of montmorillonite and liquid polybutadiene was not used and SRF carbon was added according to the formulation shown in Table 3.

TABLE 3

| Components (parts by weight) | Sample No. in Example 3 | Sample No. in Comparative Example C5 |
|---|---|---|
| NBR | 80 | 100 |
| Complex of montmorillonite and liquid polybutadiene | 30 | — |
| SRF carbon | 20 | 40 |
| Amount of montmorillonite or SRF carbon for 100 parts by weight of rubber compound | 30 | 40 |

The above-mentioned two samples, both unvulcanized and vulcanized by pressing at 160° C. for 15 minutes, were examined for physical properties. The results are shown in Table 4.

TABLE 4

| Test Items | Sample No. in Example 3 | Sample No. in Comparative Example C5 |
|---|---|---|
| 100% strain stress (MPa) | 3.6 | 2.1 |
| Hysteresis loss (%) | 21 | 17 |
| Storage modulus (MPa), at 25° C. | 15.1 | 8.9 |
| Storage modulus (MPa), at 100° C. | 8.4 | 5.5 |
| Peak temp. of mechanical loss (°C.) | −13 | −11 |
| Swelling in benzene | 4.00 | 4.01 |
| Mooney viscosity (ML$_{1+4}$, 100° C.) | 59 | 75 |

It is apparently noted from Table 4 that the sample in the working example is superior to the sample in the comparative example in tensile characteristics, dynamic viscoelastic characteristics, and swelling characteristics. The sample in the working example has a peak temperature of mechanical loss which is lower than that in the comparative example. This indicates that the silicate layers of montmorillonite are uniformly dispersed in the rubber compound. It is also noted that the sample in the working example is superior to the comparative sample in moldability and processability on account of the lower Mooney viscosity.

EXAMPLE 14

A complex composed of montmorillonite and liquid polybutadiene was prepared, followed by crushing, in the same manner as in Example 12. The crushed complex was mixed with solid rubber (chloroprene rubber (CR), "Neoprene W" made by Showa Neoprene Co., Ltd.) according to the formulation shown in Table 5. To each mixture were added 2 parts by weight of sulfur (as a vulcanizing agent), 1 part by weight of 1,3-diphenylguanidine and 1 part by weight of tetramethylthiuram monosulfide (as vulcanization accelerators), 5 parts by weight of zinc oxide (as a vulcanization auxiliary), and 1.5 part by weight of stearic acid. The mixture was kneaded by an 8-inch roll mill at 50° C. Thus there was obtained a rubber compound containing the vulcanizing agent (Sample No. 4).

For the purpose of comparison, Sample Nos. C6 to C9 specified below were prepared in the same manner as mentioned above, as shown in Table 5.

Sample No. C6. Prepared without the complex composed of montmorillonite and liquid polybutadiene.

Sample No. C7. The complex was replaced by a mixture prepared by simple mechanical mixing of montmorillonite and liquid polybutadiene.

Sample No. C8. The complex was replaced by montmorillonite alone.

Sample No. C9. The complex was replaced by HAF carbon.

TABLE 5

| Components (parts by weight) | Sample No. in Example 4 | Sample No. in Comparative Example C6 | C7 | C8 | C9 |
|---|---|---|---|---|---|
| CR | 80 | 100 | 80 | 100 | 100 |
| Complex of montmorillonite and liquid polybutadiene | 30 | — | — | — | — |
| Mechanical mixture of montmorillonite and liquid polybutadiene | — | — | 30 | — | — |
| Montmorillonite | — | — | — | 10 | — |
| HAF carbon | — | — | — | — | 40 |

TABLE 5-continued

| Components (parts by weight) | Sample No. in Example 4 | Sample No. in Comparative Example | | | |
|---|---|---|---|---|---|
| | | C6 | C7 | C8 | C9 |
| Amount of montmorillonite or HAF carbon for 100 parts by weight of rubber compound | 10 | 0 | 10 | 10 | 40 |

The above-mentioned five samples, both unvulcanized and vulcanized by pressing at 160° C. for 15 minutes, were examined for physical properties. The results are show in Table 6. It is apparently noted from Table 6 that the sample in the working example is superior to the samples in the comparative examples in tensile characteristics, dynamic viscoelastic characteristics, and swelling characteristics. The sample in the working example has a low peak temperature of mechanical loss. This indicates that the silicate layers of montmorillonite are uniformly dispersed in the rubber compound. It is also noted that the sample in the working example is superior in processability on account of the low Mooney viscosity.

TABLE 6

| Test Items | Sample No. in Example 4 | Sample No. in Comparative Example | | | |
|---|---|---|---|---|---|
| | | C6 | C7 | C8 | C9 |
| 100% strain stress (MPa) | 4.7 | 2.0 | 2.2 | 2.0 | 4.6 |
| Hysteresis loss (%) | 28 | 17 | 18 | 18 | 25 |
| Storage modulus (MPa), at 25° C. | 14.5 | 3.0 | 3.3 | 3.2 | 14.3 |
| Storage modulus (MPa), at 100° C. | 7.9 | 2.1 | 2.3 | 2.5 | 7.3 |
| Peak temp. of mechanical loss (°C.) | −27 | −25 | −27 | −24 | −24 |
| Swelling in benzene | 4.80 | 5.21 | 5.23 | 5.18 | 4.82 |
| Mooney viscosity (ML$_{1+4}$, 100° C.) | 40 | 42 | 39 | 45 | 51 |

EXAMPLE 15

Into 8.0 liters of water was dispersed 520 g of liquid polybutadiene (a product of Japan Petrochemical Co., Ltd., "EC-1800-150/100", having a molecular weight of 1800, containing 20% of ethyl cellosolve, represented by the formula below)

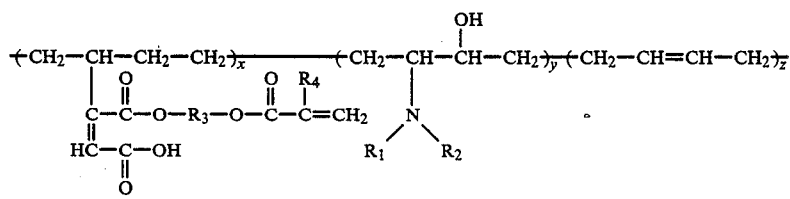

(where $x:y:z \approx 1:1:1$; $R_1$, $R_2$, and $R_4$ are an alkyl group, allyl group, aryl group, or hydrogen atom; and R, is an alkylene group, allylene group, or arylene group.)

To the dispersion was added 47.3 ml of conc. (35%) hydrochloric acid. The dispersion of the liquid polybutadiene was added to a suspension of Na-type montmorillonite (385 g) dispersed in 20 liters of water by using a propeller stirrer. The Na-type montmorillonite is "Kunipia F" made by Kunimine Kogyo Co., Ltd., having a silicate layer thickness of 10 Å, a silicate layer size of 1000 Å by 1000 Å, a layer surface area of 100 Å$^2$ per negative charge, and a cation exchange capacity of 119 milliequivalents per 100 g.

The reaction product was filtered and collected by a filter press, followed by preliminary drying at 80° C. and vacuum drying at 100° C. Thus there was obtained a complex composed of montmorillonite and liquid polybutadiene. The spin-spin relaxation time (T$_2$), of the complex was measured by pulse NMR. There were observed T, component (T$_{2S}$) of about 10 μs in the resin (glass) state and T$_2$ component (T$_{2L}$) of about 1 ms in the rubber state in terms of molecular mobility of proton ($^1$H) in the liquid polybutadiene. The amount of the T$_{2S}$ component corresponding to the region in which the molecular mobility is strongly restricted is greater than 50%. This indicates that a strong bond is formed between the montmorillonite and the liquid polybutadiene and more than 50% of the rubber molecular chain is restricted near the interface. The X-ray diffractometry of this complex indicates that the (001) plane of montmorillonite has disappeared and the layers of montmorillonite are uniformly dispersed in the liquid polybutadiene. Incidentally, it was found that the montmorillonite in the complex has a silicate interlayer distance of 43 Å.

The complex was mixed with solid rubber (acrylonitrilebutadiene copolymer rubber (NBR), containing 41% of AN, "Nipol 1041B" made by Nippon Zeon Co., Ltd.) according to the formulation shown in Table 7. To each mixture were added 0.5 parts by weight of sulfur (as a vulcanizing agent), 1 part by weight of cyclohexylbenzothiazolyl sulfenamide and 2 parts by weight of tetramethylthiuram disulfide (as vulcanization accelerators), 5 parts by weight of zinc oxide (as a vulcanization auxiliary), and 1 part by weight of stearic acid. The mixture was kneaded by an 8-inch roll mill at 50° C. Thus there were obtained rubber compounds (Sample Nos. 5 and 6). The amount of montmorillonite filled in Sample Nos. 5 and 6 is 5 parts by weight and 10 parts by weight, respectively, for 100 parts by weight of the rubber compound.

For the purpose of comparison, Sample Nos. C10 to C13 specified below were prepared in the same manner as mentioned above according to the formulation shown in Table 7.

Sample No. C10. Produced from pure NBR without the complex.

Sample No. C11. The complex was replaced by a mixture prepared by simple mechanical mixing of montmorillonite and liquid polybutadiene at a ratio of 1:1.

Sample No. C12. The complex was replaced by montmorillonite alone.

Sample No. C13. The complex was replaced by FEF carbon.

In the case of Sample No. C11, which is a mere mechanical mixture of montmorillonite and liquid poly butadiene, the X-ray diffractometry gave a hardly varying peak corresponding to the (100) plane of montmorillonite and the pulse NMR gave no data corresponding to the region of the rubber with its molecular mobility strongly restricted. This indicates that there is only a small mutual action between the montmorillonite and the liquid polybutadiene. Incidentally, the mechanical mixture is an uncrushable paste, with the coagulated montmorillonite enclosed by the liquid polybutadiene. The amount of montmorillonite or carbon black filled in Sample Nos. C10 to C13 is 0, 10, 10, and 20 parts by weight, respectively, for 100 parts by weight of the rubber compound.

The above-mentioned six samples, both unvulcanized and vulcanized by pressing at 160° C. for 20 minutes, were examined for physical properties. The results are shown in Table 8. It is apparently noted from Table 8 that the samples in the working examples are superior to the samples in the comparative examples in tensile characteristics, dynamic viscoelastic characteristics, and swelling characteristics. The samples in the working examples have a peak temperature of mechanical loss which is lower than that of Sample No. C10 prepared from pure rubber. This indicates that the liquid rubber component is solubilized in the solid rubber and the silicate layers of montmorillonite are uniformly dispersed in the rubber compound.

It is also notes that the samples in the working examples are superior to the comparative samples (except for Sample No. C11) in moldability and precessability on account of the lower Mooney viscosity. (In the case of Sample No. C11, the liquid rubber incapable of combining with montmorillonite functions as a plasticizer by itself, lowering the Mooney viscosity to an extreme extent. However, it has no advantages in other properties.)

TABLE 7

| Components (parts by weight) | Sample No. in Example | | Sample No. in Comparative Example | | | |
|---|---|---|---|---|---|---|
| | 5 | 6 | C10 | C11 | C12 | C13 |
| NBR | 95 | 90 | 100 | 90 | 100 | 100 |
| Complex of montmorillonite and liquid polybutadiene | 10 | 20 | — | — | — | — |
| Mechanical mixture of montmorillonite and liquid polybutadiene | — | — | — | 20 | — | — |
| Montmorillonite | — | — | — | — | 10 | — |
| FEF carbon | — | — | — | — | — | 20 |
| Amount of montmorillonite or FEF carbon for 100 parts by weight of rubber compound | 5 | 10 | 0 | 10 | 10 | 20 |

TABLE 8

| Test Items | Sample No. in Example | | Sample No. in Comparative Example | | | |
|---|---|---|---|---|---|---|
| | 5 | 6 | C10 | C11 | C12 | C13 |
| 100% strain stress (MPa) | 3.0 | 4.2 | 1.1 | 1.2 | 1.1 | 2.1 |
| Hysteresis loss (%) | 14 | 19 | 8 | 9 | 9 | 11 |
| Storage modulus (MPa), at 25° C. | 10.1 | 14.9 | 3.9 | 4.3 | 4.1 | 6.4 |
| Storage modulus (MPa), at 100° C. | 8.8 | 11.4 | 3.3 | 3.4 | 3.5 | 5.0 |
| Peak temp. of mechanical loss (°C.) | −4 | −4 | −3 | −4 | −1 | −1 |
| Swelling in benzene | 3.15 | 3.03 | 3.90 | 3.92 | 3.86 | 3.80 |
| Mooney viscosity ($ML_{1+4}$, 100° C.) | 56 | 53 | 65 | 50 | 68 | 74 |

What is claimed is:

1. A composite material, which comprises:
   (a) at least one resin selected from the group consisting of a vinyl-based polymeric compound, a thermosetting resin and a rubber, and
   (b) a layered silicate uniformly dispersed in said resin, said layered silicate having a layer thickness of about 7 to 12 Å and an interlayer distance of at least about 30 Å, wherein said at least one resin is connected to said layered silicate through an intermediate therebetween.
2. The composite material as claimed in claim 1, wherein said intermediate is an ionic bond.
3. The composite material as claimed in claim 1 wherein said layered silicate is negatively charged and one negative charge occupies an area of 25 to 200 Å$^2$ on the layer surface.
4. The composite material as claimed in claim 1 wherein the content of said layered silicate is 0.05 to 150 parts by weight per 100 parts by weight of the resin.
5. The composite material as claimed in claim 1 wherein the composite material comprises a complex and solid rubber, said complex being composed of liquid rubber having a positively charged group and the layered silicate uniformly dispersed therein, the interlayer distance of said layered silicate being greater than 30 Å and the liquid rubber being dissolved in the solid rubber.
6. A composite material as claimed in claim 5, wherein the liquid rubber is one which has a molecular weight greater than 1000.
7. The composite material as claimed in claim 5, wherein the layered silicate is contained in the complex in an amount of 20 to 1000 parts by weight per 100 parts by weight of the liquid rubber.
8. The composite material as claimed in claim 5, wherein the solid rubber is at least one selected from the croup consisting of natural rubber, synthetic rubber, thermoplastic elastomer, and a blend thereof.
9. The composite material as claimed in claim 5, wherein the solid rubber is a diene rubber.
10. The composite material as claimed in claim 5, wherein the solid rubber is one which has a molecular weight not less than 10000.
11. The composite material as claimed in claim 5, wherein the content of said complex is 1 to 10 parts by weight per 100 parts by weight of the solid rubber.
12. The composite material as claimed in claim 1, which further comprises carbon black.
13. The composite material as claimed in claim 12, wherein the content of carbon black is 0 to 100 parts by weight for 100 parts by weight of solid rubber.
14. The composite material as claimed in claim 1, wherein said resin is rubber.
15. The composite material as claimed in claim 1, wherein said layered silicate is a smectite clay mineral.
16. A composite material, which comprises:
   (a) at least one resin selected from the group consisting of a vinyl-based polymeric compound and a thermosetting resin, and
   (b) a layered silicate uniformly dispersed in said resin, wherein said layered silicate has a layer thickness of about 7 to 12 Å and an interlayer distance of at least about 30 Å, and wherein said at least one resin is connected to said layered silicate through the side chains of said resin.
17. A composite material, which comprises:
   (a) solid rubber, and
   (b) a layered silicate uniformly dispersed in said resin, wherein said layered silicate has a layer thickness of about 7 to 12 Å, and an interlayer distance of at least about 30 Å, and wherein said solid rubber is connected with said layered silicate through a liquid rubber dissolved in said sloid rubber.

* * * * *